Patented Apr. 28, 1931

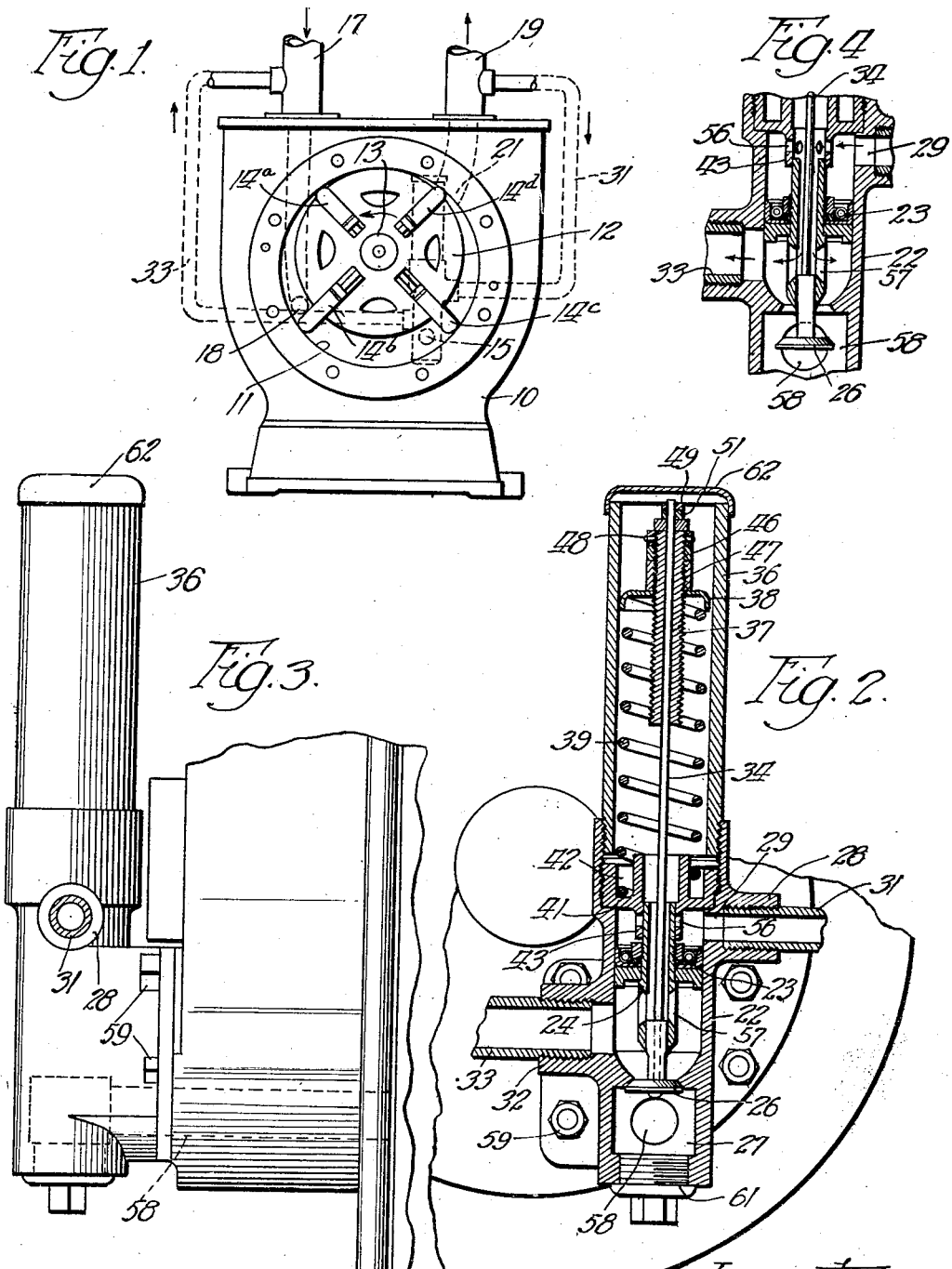

1,802,610

UNITED STATES PATENT OFFICE

GEORGE C. LAMMERT, OF CHICAGO, ILLINOIS

PRESSURE-REGULATING SYSTEM

Application filed June 23, 1928. Serial No. 287,708.

My invention relates to pressure regulating systems and has to do more particularly with air or gas pressure systems in which the air or gas pressure in a supply line or tank is to be maintained at substantially a constant pressure.

In systems where an air or gas pressure is used, such as for oil burning or other purposes, a pump is usually supplied having a capacity to maintain the pressure at a substantially constant rate with a predetermined substantial constant consumption of the air. In such systems there is frequently a variation in consumption and with the pump running at a constant speed the line pressure will vary with the consumption. Such variation is frequently undesirable, particularly where a substantially constant pressure is most effective. Such variations of line pressure with variations in consumption occur more particularly where rotary valveless compressors are used in which there is a constant intake and constant output with constant speed of the compressor.

To overcome this variation in consumption-line pressure, I have provided a system of control including a novel form of valve which is connected to the pump cylinder and exhaust or delivery line, or to the consumption-line or chamber, as the case may be, so that a variation or increase in pressure of the delivery line will operate the valve to vary the amount of air that is compressed by the pump cylinder and thus vary the amount of air delivered by the pump and thereby maintain a substantially constant line pressure although the amount of air taken from the delivery line varies. A further feature of my control system is that the valve is so constructed as to relieve the delivery line or consumption circuit of excessive pressure and conduct it to the atmosphere or back into the pump, should the delivery line take on a pressure beyond that which the relief of the cylinder alone can take care of.

In this connection it is to be noted that in a rotary pump, for instance, where an air inlet is provided for the cylinder, it has heretofore been suggested that an auxiliary connection between the cylinder and atmosphere may be provided so that part of the air taken into the cylinder will be exhausted during the compression stroke before compression of the remaining air takes place so that the amount of air delivered by the cylinder is reduced below its normal capacity. Thus with the pump running at constant speed, by varying this auxiliary opening the amount of air delivered by the compressor may be varied and to a certain degree the pressure in the delivery or consumption-line be maintained at a substantially constant pressure. It has been found, however, that the amount of air which a cylinder may be relieved of in this manner is limited to some extent, depending on how early the exhaust port opens before the compression stroke is completed. It frequently happens that although the cylinder is thus relieved to its fullest extent, it is still insufficient to keep the pressure in the supply line down to the desired point.

To overcome this last difficulty I have provided a control in my improved valve, whereby this auxiliary exhaust port or opening may be varied up to the fullest capacity of relief of the cylinder, but should this be insufficient to maintain the line pressure constant, the valve is further operated or controlled so as to relieve the line of pressure in excess of what the auxiliary port can take care of and thus maintains substantially constant line pressure.

For a better understanding of my invention reference is to be had to the accompanying drawing, in which I have shown a control system including a rotary pump by way of illustration, and in which—

Fig. 1 is a side view of a rotary pump with the valve and control connections shown in dotted lines and with the cylinder head removed to show the piston construction;

Fig. 2 is an enlarged vertical sectional view through the valve;

Fig. 3 is a right side elevation of the valve of Fig. 2, with a portion of the cylinder head; and Fig. 4 is a sectional view through part of the valve showing the valve in its fully opened position.

Although the system of my invention may be applied to various kinds of air or gas pressure apparatus, I have illustrated it as used with a valveless rotary compressor and Fig. 1 of the drawings illustrates the manner in which the system is arranged.

The compressor comprises in general a cast body 10, finished with a central bore 11, with a rotor 12 on a shaft 13 placed eccentric to the main bore of the pump. Vanes 14 are separated by push rods, connected to the rotor and are automatically adjustable so that the outside of the vanes is maintained in contact with the inside surface of the bore throughout the entire rotation thereof. An intake line 17 is connected through to the inside of the bore through a port 18, while an exhaust or delivery line 19 is opened to the bore at 21. As the rotor revolves in the direction indicated by the arrow, a quantity of air or gas is drawn into the continuously expanding space between the vanes 14a and 14b until the vane 14a passes the port 18 at which time the next pair of vanes is ready to start the same suction operation. At the same time the air between the vanes 14c and 14d is being compressed as the space between them diminishes so as to discharge a quantity of compressed air through the delivery pipe 19. The air between the vanes 14b and 14c is also partially compressed, so that the air between any pair of vanes is gradually compressed and then discharged. The three "chambers" which are referred to for convenience of description, may be called intake, pressure and discharge chambers, respectively.

The air or gas trapped between the vanes 14b and 14c may be allowed to escape partially through a suitable vent 15 in order to modify the pressure obtained in the line 19. This vent is placed, however, in such a position that the air in the delivery line cannot pass back through the pressure or discharge chamber and pass out to the atmosphere or into the compressor illustrated. It is placed 90° in advance of the lower lip of the discharge port and one vane always separates this vent from the delivery opening thus preventing the loss of any high pressure air or gas and its work of compression from the delivery line until the limitations of the pump require it. As pointed out, however, the simple venting of this space is not an entirely practical control expedient and my invention contemplates an improvement in the practice whereby the pressure is more accurately controlled.

Before referring to the system, I shall describe my improved valve designed to make the system operable and which valve is of particular advantage when used therewith. The valve includes a body 22, the center part of which comprises a cylinder in which a leather washer type of piston 23 is reciprocable. The piston is secured intermediate the ends of a hollow piston rod 24, at one end of which a valve 26 is secured bearing against a seat formed between the cylinder and a chamber 27. Above the piston 23 is a boss 28 through which an opening 29 is provided, a pipe 31 being connected in the opening and adapted to lead to the pressure line 19. Below the piston, a boss 32 has connected thereto a pipe 33 leading to the intake line 17 in a manner and for a purpose which will be described.

As appears plain from Fig. 2, the pressure in the line 19 being communicated by means of the pipe 31 to the top of the piston 23, such pressure will naturally have the effect of exerting itself against the piston, with the effect of driving said piston downwardly and unseating the valve 26. I have balanced this effect by means of a spring, the tension of which can be adjusted so that the amount of pressure required to displace the piston may be controlled.

In arranging this spring construction, a rod 34 extending through the valve 26 for the purpose of securing it to the piston rod, extends upwardly into a cylindrical housing 36, which is screwed into a cylindrical portion of the body 22. The upper end of the rod 34 has a sleeve 37 on which is a spring cap 38 engaging the upper end of a spring 39, the lower end of the spring fitting into a spring support and piston rod guide 41, an annular recess 42 serving to receive the bottom of the spring and a boss 43 serving as a guide to the upper end of the piston rod 34.

Lock nuts 46 and 47 are threaded on the sleeve above the spring cap 38 and by means of them, the position of the spring cap is adjusted. A pin 48 prevents the rod 34 from turning inside the sleeve 37 and a pair of nuts 49 and 51 serves to secure the upper end of the rod. A washer 52 also acts as a stop for the lock nut 47.

The boss 43 is provided with a number of apertures 56 which lead into the chamber space above the piston 23 so that if the piston rod descends downwardly a sufficient distance, these ports will be uncovered thereby allowing pressure from the line 31, which is the pressure actuating the piston 23, to escape through the ports or apertures 56 down through the hollow piston rod, and out through ports 57 provided in the lower portion of the rod, whence the pressure escapes through the pipe 33 back to the supply pipe of the pump.

The chamber 27 is provided with a vent 58 which when the valve is secured to the side of the pump with lag screws 59, for example, as shown in Fig. 2, the vent 58 may be opened to the space between the vanes 14b and 14c. In other words, the space between the vents in the position which these vanes occupy in Fig. 1, will be open to the vent 58. After the valve 26 is closed, the chamber 27 will be air-tight and there will be no loss of pressure. When the valve is open, however, the loss of air through the vent 58 will be in proportion to the amount of opening.

The bottom of the chamber 27 is apertured to facilitate assembly of the valve but it is closed by a plug 61. A cap 62 on the top of the spring housing 36 closes the valve off at the top. In connecting the valve into the system, the pipe 31 leads to the pressure line 19, while the pipe 33 leads to the suction or intake line 17. The regulation valve is secured directly on the end of the pump so that the vent 58 may be opened between the vanes 14b and 14c in the manner previously described.

In the operation of the device, the tension of the spring 39 is regulated so that it will stand all pressure up to the capacity line of 19, or all that it is desired to maintain therein. As soon as the pressure exceeds the predetermined amount, the valve 26 will be partly opened and the space between the vanes 14c and 14d will become vented, thus removing a certain amount of air or gas therefrom so that there will be less air or gas compressed in the pressure space between the vanes 14c and 14d and accordingly the pressure in the line 19 will be decreased.

If the pressure in the line 19, for some unusual reason, continues to increase, the piston 23 will be driven downwardly carrying the piston rod 24 with it, and still further opening the valve 26. Accordingly, the venting will continue to be more effective up to a certain point, which as previously described, is determined by the location of the exhaust port. When this point is reached, if the pressure still increases, the ports 56 will begin to be uncovered, thus actually opening the line 31 something after the manner of a relief or blow-off valve, and the remaining air delivered by the pump can be sent back to the inlet and it will be impossible for the pressure to increase. The amount of compressed air escaping through the ports 56 is of course determined by the area of such ports uncovered, and the area uncovered will depend on the increase in pressure. I design my valve so that with the entire shutting off of the pipe 19 the pressure generated by the pump can dissipate and there is no possibility of injury either to the line or pump or any apparatus driven or controlled thereby.

Although the description of the operation of the pump refers to change of pressure in the line 19, it is obvious that these changes take place with such great rapidity that the effect of the valve is to keep the pressure constant. In other words, the change of pressure will be effective against the valve itself before it will make itself apparent in the place of location of apparatus, for example, oil burners, using the compressed air. The valve and system employing it are therefore efficient to maintain uniform pressure under all conditions from that in which the full capacity of the pump is being utilized by the apparatus, to that in which substantially all of the apparatus is shut down.

Where air is mentioned in the appended claims it is meant to include any compressible gas, a fluid which may be handled by the compressor mechanism described.

Although I have described certain of the features of my invention in order to enable those skilled in the art to practice the same, it is obvious that I am not restricted to such details, and the invention is limited only by the scope of the appended claims.

What I claim as new and desire to secure by United States Letters Patent is:—

1. A valve mechanism for use in combination with an air pressure pump having a pressure cylinder and a discharge line comprising means for venting said cylinder during a portion of its cycle of operation when the line pressure increases a predetermined amount, and means for venting said discharge line when the line pressure reaches a still greater amount.

2. A valve mechanism for use in combination with a rotary air pressure pump having a pressure cylinder and a discharge line comprising means for automatically regulating the output of said cylinder in accordance with the pressure in said discharge line up to a certain pressure, and means for venting the discharge line when a still greater pressure exists therein.

3. A valve mechanism for use in combination with an air pressure pump having a pressure cylinder and a discharge line comprising means for venting the cylinder to the point at which the exhaust port of the cylinder opens, and means for venting the remainder of the air from the discharge line up to a point including the entire output of the pump.

4. A valve mechanism for use in combination with an air pressure pump operating at a constant speed, comprising means for maintaining a constant pressure discharge from said pump independent of the amount of air used from the discharge line within the capacity of the pump, said pump consuming power in accordance with the amount of air delivered.

5. A valve mechanism for use in a valveless rotary compressor having a plurality of vanes, pressure and discharge chambers between the vanes and with intake and discharge lines connected into the intake and discharge chambers, comprising means for venting the pressure chamber up to the point at which it opens to the exhaust port in accordance with the pressure in the discharge line, and means for venting the discharge line in accordance with the pressure therein, and when such pressure exceeds a predetermined amount.

6. A valve mechanism for use in combination with a pressure pump having a pressure cylinder, comprising a valve including a cylinder with a piston therein, a connection from the pressure side of the pump to the piston to operate the valve and means permitting the escape of some of the air actuating said piston when said piston is advanced a predetermined amount.

7. A valve mechanism for the purpose described comprising a venting chamber, a chamber connected into an air intake line, a chamber connected into an air pressure line, a valve between the venting chamber and the intake chamber, and a second valve between the pressure chamber and said intake line.

8. A valve mechanism for the purpose described comprising a venting chamber, a chamber connected into an air intake line, a chamber connected into an air pressure line, a valve between the venting chamber and the intake chamber, a second valve between the pressure chamber and said intake line, and means whereby the first mentioned valve only is actuated up to a predetermined amount, with the second mentioned valve operating thereafter.

9. A valve mechanism for the purpose described comprising a venting chamber, a chamber connected into an air intake line, a chamber connected into an air pressure line, a valve between the venting chamber and the intake chamber, a second valve between the pressure chamber and said intake line, and a piston operated by the pressure in said pressure line for controlling the operation of both of said valves.

10. A valve mechanism for the purpose described comprising a venting chamber, a chamber connected into an air intake line, a chamber connected into an air pressure line, a valve between the venting chamber and the intake chamber, a second valve between the pressure chamber and said intake line, a piston operated by the pressure in said pressure line for controlling the operation of both of said valves, and an adjustable pressure spring for predetermining the amount of pressure required to actuate said valve.

11. In a rotary pump having an air compression chamber connected to an output line and provided with a venting aperture, a valve for said aperture, means for operating said valve in response to pressure in the output line, and means effective upon a predetermined movement of said valve for venting the line pressure.

12. In a rotary pump having an air compression chamber connected to an output line and wherein the air is compressed prior to the establishment of connection with the output line, said compression chamber having a venting aperture, a valve for controlling the outlet through said aperture, said valve being operable in response to line pressure, and means responsive to a predetermined movement of said valve for relieving line pressure.

In witness whereof, I hereunto subscribe my name this 21st day of June, 1928.

GEORGE C. LAMMERT.